US009380676B2

(12) United States Patent
Bueno et al.

(10) Patent No.: US 9,380,676 B2
(45) Date of Patent: Jun. 28, 2016

(54) INDEPENDENTLY ADJUSTABLE CURRENT AND VOLTAGE AC-AC CONVERTER

(71) Applicant: Dialight Corporation, Farmingdale, NJ (US)

(72) Inventors: David L. Bueno, Pueblo, CO (US); Cameron L. Harvey, Rye, CO (US)

(73) Assignee: Dialight Corporation, Farmingdale, NJ (US)

( * ) Notice: Subject to any disclaimer, the term of this patent is extended or adjusted under 35 U.S.C. 154(b) by 606 days.

(21) Appl. No.: 13/754,321

(22) Filed: Jan. 30, 2013

(65) Prior Publication Data

US 2013/0193868 A1 Aug. 1, 2013

Related U.S. Application Data

(60) Provisional application No. 61/593,413, filed on Feb. 1, 2012.

(51) Int. Cl.

| *H05B 37/02* | (2006.01) |
|---|---|
| *H05B 41/24* | (2006.01) |
| *H02M 5/293* | (2006.01) |
| *H02M 1/12* | (2006.01) |
| *H02M 1/42* | (2007.01) |

(52) U.S. Cl.
CPC ............ *H05B 37/02* (2013.01); *H02M 5/293* (2013.01); *H05B 41/24* (2013.01); *H02M 1/12* (2013.01); *H02M 1/4225* (2013.01)

(58) Field of Classification Search
CPC ................................. H05B 37/02; H05B 41/24
USPC ...................................... 315/313, 247; 363/89
See application file for complete search history.

(56) References Cited

U.S. PATENT DOCUMENTS

| 5,598,326 | A | 1/1997 | Liu et al. | |
|---|---|---|---|---|
| 5,907,223 | A | 5/1999 | Gu et al. | |
| 6,346,778 | B1 | 2/2002 | Mason et al. | |
| 6,525,490 | B1 | 2/2003 | Rinaldi | |
| 7,449,844 | B2 | 11/2008 | Lev et al. | |
| 2003/0222603 | A1* | 12/2003 | Mogilner et al. | ............. 315/312 |
| 2007/0189044 | A1 | 8/2007 | Liu et al. | |
| 2009/0206950 | A1* | 8/2009 | Venkatesh | ..................... 333/178 |
| 2011/0006699 | A1 | 1/2011 | Nerone | |
| 2011/0199016 | A1* | 8/2011 | Rinaldi | ........................ 315/291 |

OTHER PUBLICATIONS

International Search Report and Written Opinion for International Patent Application Serial No. PCT/US2013/023907, mailed Apr. 5, 2013, consists of 7 unnumbered pages.
European Supplemental Search Report dated Feb. 24, 2016 in corresponding EP 13 74 3958, pp. 1-5.

* cited by examiner

*Primary Examiner* — Jue Zhang

(57) ABSTRACT

The present disclosure is directed to an alternating current (AC) to AC converter circuit for independently adjusting a current and voltage to adjust a light output of a light operating on AC power. In one embodiment, the AC to AC converter circuit includes a microprocessor, a first switch coupled to the microprocessor, a power factor controller (PFC) module coupled to the first switch, wherein the first switch is controlled by the microprocessor in accordance with a desired power output, one or more boost switches coupled to the PFC module, wherein the one or more boost switches are controlled by the PFC module as a function of an operation of the first switch and one or more load switches coupled to the one or more boost switches, wherein the one or more load switches are controlled by the microprocessor in accordance with the desired power output.

14 Claims, 4 Drawing Sheets

INDEPENDENTLY ADJUSTABLE CURRENT AND VOLTAGE AC-AC CONVERTER

CROSS REFERENCE TO RELATED APPLICATIONS

This application claims priority under 35 U.S.C. §119(e) to U.S. provisional patent application Ser. No. 61/593,413, filed on Feb. 1, 2012, which is hereby incorporated by reference in its entirety.

BACKGROUND

Current street lights operating on an alternating current (AC) power source only have the ability to turn on and off. In other words, the street lights operating on AC power cannot be dimmed to some level of brightness in between an on and off state.

Current street light fixtures only provide a receptacle for receiving a three pronged connector. Some dimming controls exist, but would require a receptacle for receiving a five pronged connector. As a result, all existing street light fixtures would need to be modified, which may be prohibitively time consuming and expensive.

Alternatively, street light fixtures may be modified internally. However, such modification may void the manufacturer's warranty on the street light fixture. In addition, the street light fixture may not provide enough space for all of the components that would be required to provide dimming control.

Other methods for dimming AC powered lights include converting the AC power into direct current (DC) power, adjusting the power and then re-converting the DC power to AC power before it is delivered to the street light fixture. However, this method is inefficient. In addition, this method would require additional hardware modules to perform the conversion. The additional modules may not fit in a photo-controller module used to control the street light fixture.

SUMMARY

In one embodiment, the present disclosure provides an alternating current (AC) to AC converter circuit for independently adjusting a current and voltage to adjust a light output of a light operating on AC power. In one embodiment, the AC to AC converter circuit comprises a microprocessor, a first switch coupled to the microprocessor, a power factor controller (PFC) module coupled to the first switch, wherein the first switch is controlled by the microprocessor in accordance with a desired power output, one or more boost switches coupled to the PFC module, wherein the one or more boost switches are controlled by the PFC module as a function of an operation of the first switch and one or more load switches coupled to the one or more boost switches, wherein the one or more load switches are controlled by the microprocessor in accordance with the desired power output.

In one embodiment, the present disclosure provides a method for adjusting a light output of a light operating on alternating current (AC) power. In one embodiment, the method comprises receiving a control signal to change an amount of power delivered to the light, wherein the power is delivered from an AC power source, operating one or more load switches in accordance with the amount of power, monitoring a current level and a voltage level while the one or more load switches are operating and sending a signal to a switch coupled to a power factor controller (PFC) module if the light is operating at a non-optimal voltage level, wherein the PFC adjusts the voltage level in accordance with an operation of the switch.

In one embodiment, the present disclosure provides a tangible computer-readable medium to store a plurality of instructions which, when executed by a processor, cause the processor to perform operations for adjusting a light output of a light operating on alternating current (AC) power. The operations include receiving a control signal to change an amount of power delivered to the light, wherein the power is delivered from an AC power source, operating one or more load switches in accordance with the amount of power, monitoring a current level and a voltage level while the one or more load switches are operating and sending a signal to a switch coupled to a power factor controller (PFC) module if the light is operating at a non-optimal voltage level, wherein the PFC adjusts the voltage level in accordance with an operation of the switch.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As discussed above, there is no elegant solution to providing dimming ability of light sources, such as for example, street light fixtures that operate on an AC power source. One embodiment of the present disclosure provides an AC to AC converter circuit for independently adjusting a current and voltage to adjust a light output of a light operating on AC power.

In other words, the AC power does not need to be first converted into DC power for adjustment. As a result, the circuit may fit in an existing photocontroller housing. In addition, the standard three prong outlet receptacle may be maintained on existing street light fixtures. Said another way, the present disclosure provides a "plug and play" solution that provides dimming control of a light source operating on AC power without the need for any AC to DC and/or DC to AC conversion.

Figure 1:
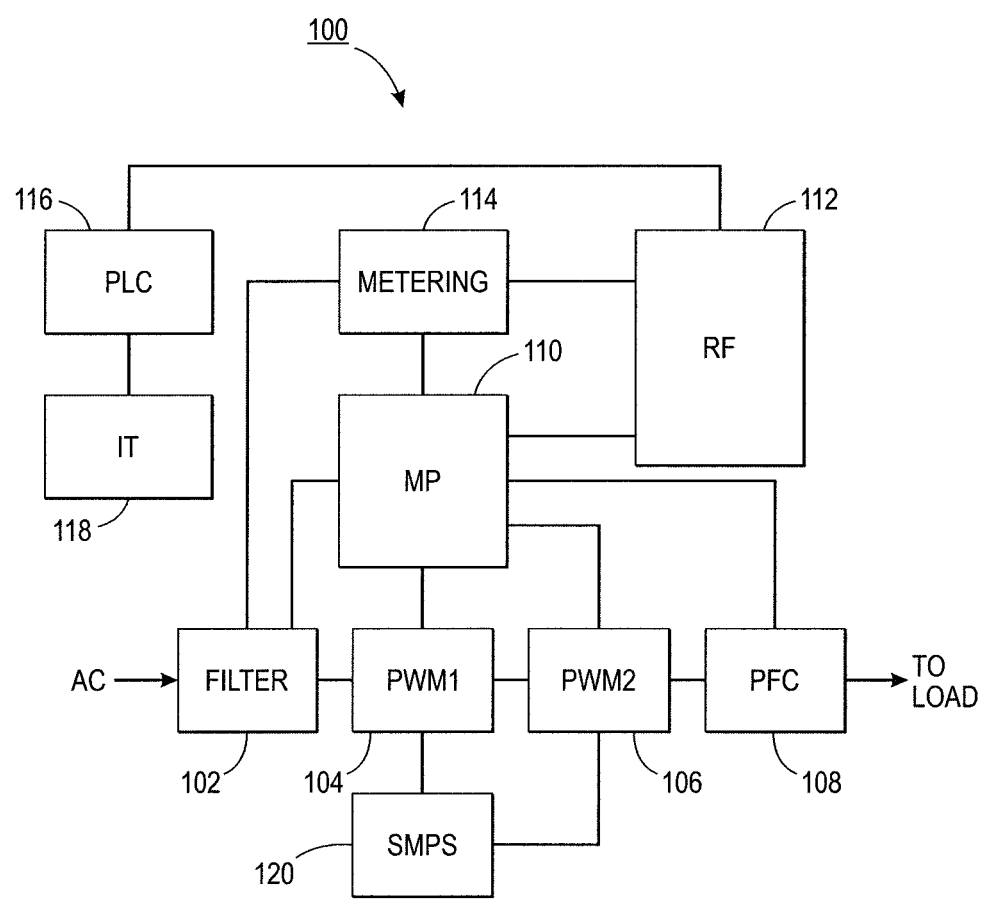
FIG. 1 depicts a block diagram of one embodiment of an example AC to AC converter circuit.

FIG. 1 illustrates a high level block diagram of one embodiment of an AC to AC converter circuit 100. In one embodiment, the circuit 100 includes an optional filter 102, a first pulse width modulation module (PWM1) 104, a second PWM2 106, a power factor controller (PFC) module 108, a microprocessor (MP) 110, a radio frequency (RF) communication module 112, a metering module 114, a power line communication (PLC) 116, an isolation transformer (IT) 118 and a switch mode power supply (SMPS) 120.

In one embodiment, the RF communication module 112, the PLC module 116 and the IT 118 provide remote control by one of various network protocols. For example, control signals may be sent from a remotely located control server over a wired or wireless connection via a wide area network (WAN). For example, the operation of the light source or brightness of a light source may be controlled remotely via the RF communication module 112 or the PLC module 116.

In one embodiment, the metering module 114 may be a module or device capable of monitoring a voltage level and a current level in the circuit. In one embodiment, the metering module 114 may be deployed as a metering system on a chip (M-SOC), multiple M-SOCs, an external metering module in communication with the MP 110, a sensor array with raw data input and the like. The metering module 114 may provide the voltage level and the current level to the MP 110.

In one embodiment, the MP 110 may use the measured voltage level and the current level to send control signals to the PWM2 106 and/or the PFC 108 to adjust the voltage level to change the intensity level or a level of light output of the AC powered light source. This is discussed in further detail below.

In one embodiment, the SMPS 120 may be an isolated SMPS. The SMPS may convert the AC power to DC power to operate and power various devices and modules within the circuit 100. However, it should be noted that the SMPS is not used to convert the AC power to DC power that is delivered to the light source.

In one embodiment, the filter 102 uses a combination of capacitance, resistance and inductance to filter destructive harmonic wave forms or switching noise in the circuit 100. The filter 102 may be controlled by the combination of feed forward and feedback circuits to effectively adapt the changing load and line conditions by adding or subtracting inductance, capacitance or resistance in any number of circuit configurations. The adjustments may be controlled by the microprocessor 110.

In one embodiment, the filter 102 may be a dynamic filter. In other words, the filter 102 may be configured to change the levels for which the destructive harmonic wave forms or switching noise are filtered out. In another embodiment, the filter 102 may be static. In other words, the filter 102 may be set for a worst case scenario without any adjustments in response to the changing load and line conditions.

In one embodiment, the PWM1 104 may perform voltage boost functions. The PWM1 104 may be controlled by the PFC 108 via feed forward and feedback loops. The PWM1 104 may be operated based upon a variable power level detected from the PWM2 106. The PWM1 104 operates in a variety of circuit configurations to perform the operation of boosting the line voltage. The PWM1 104 enables the power to be delivered to the load at the variable power level and a variable voltage level that can be adjustable in a disjoint or independent manner.

In one embodiment the PWM2 106 may adjust a filtered AC power by altering a duty cycle or frequency of a chopped PWM AC sine wave. The PWM2 106 may operate in two stages. In the first stage, the PWM2 106 may feed power to a load. In the second stage, the PWM2 may interrupt the current path imposing a dead time creating an open circuit condition. The dead time provides a freewheeling safe commutation path complementary to the load for reactive inductive loads. This freewheeling circuitry bridge-less circuitry establishes a path for the commutation current for eliminating the destructive voltage spikes in the switches without the power losses of convention snubber circuits.

In one embodiment, the operation of the PWM1 104 and the PWM2 106 as controlled by the PFC 108 and the MP 110, respectively, alters the AC power input to produce a desired current output. For example, the output voltage can be proportional to a lower current output or can be boosted by the PWM2 106.

For example, the control signals from the MP 110 may be adapted to the changing desired voltage and current levels to provide a regulated linearly adjustable power source for a variety of loads both resistive and inductive in conjunction with the feedback from the PFC module 108. In other words, the MP 110 can continuously change the control signals sent to the PFC module 108 and the PWM2 104 based upon the changing voltage and current levels in the circuit 100 and the desired light output or desired intensity level. Accordingly, the PFC module 108 may continuously change the control signals sent to the PWM1 106 to adjust the line voltage.

The control of various loads in many cases may be customized for the correct operation of the individual load. This may be accomplished through the start procedure in unison to and with the feed-forward, feedback response and predetermined values stored in the MP 110. Furthermore, the MP 110 can be enhanced with additional storage capability and can then adapt to an even wider range of products.

Figure 2:
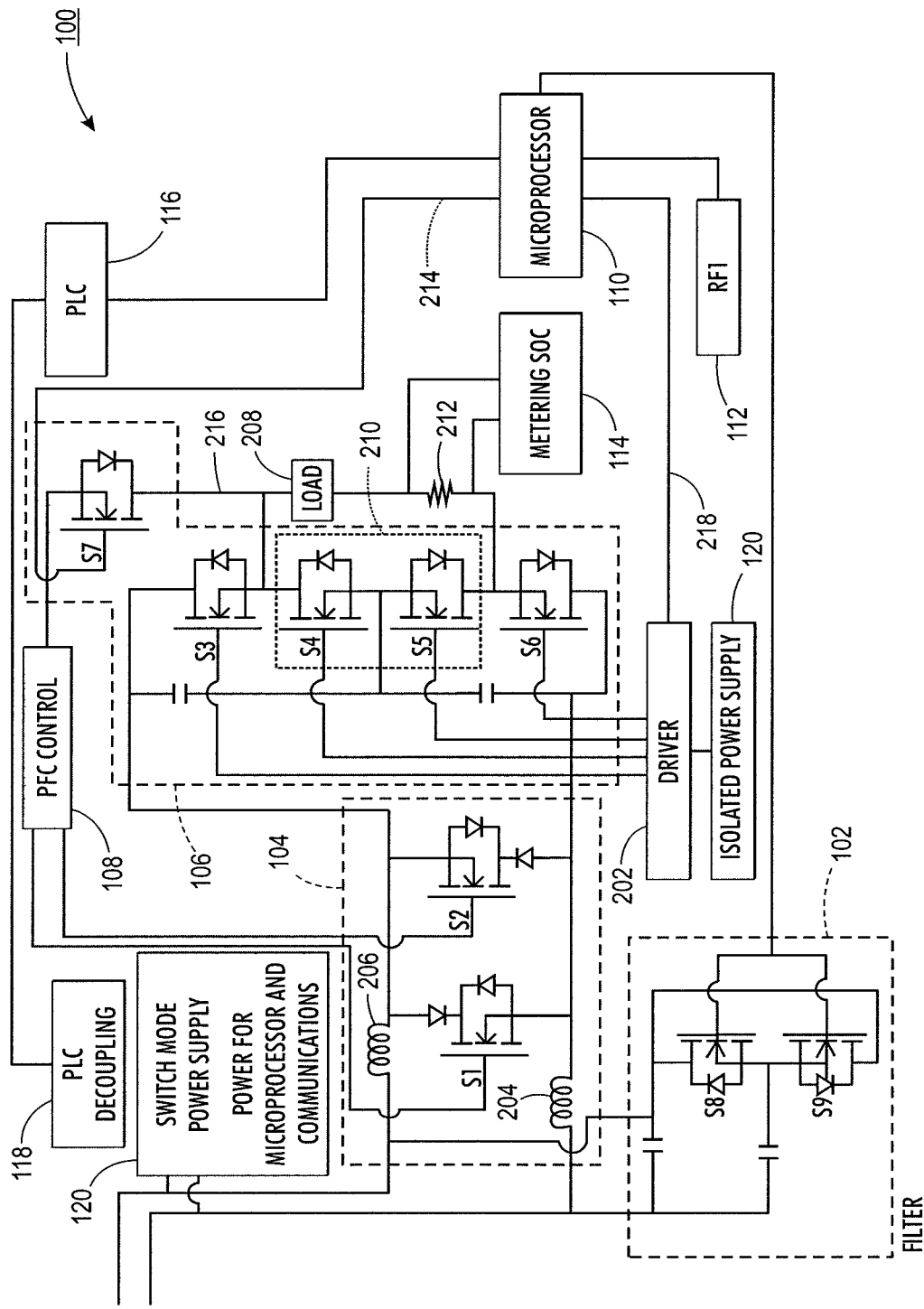
FIG. 2 depicts a more detailed diagram of one embodiment of an example AC to AC converter circuit.

FIG. 2 illustrates a more detailed diagram of one embodiment of the example AC to AC converter circuit 100. In one embodiment, the PWM1 104 illustrated by dashed lines may comprise a switch S1, a switch S2 and one or more inductors 204 and 206. In one embodiment, the switches S1 and S2 may be one or more boost switches. In one embodiment, the inductors 204 and 206 may store voltage that may be eventually released to the PWM2 106 as the switches S1 and S2 are activated.

In one embodiment, the two switches S1 and S2 are provided to operate in alternating fashion depending on a direction of the AC wave signal or sine wave. For example, the switch S1 may operate during a first portion of the AC wave signal and the switch S2 may operate during a second portion of the AC wave signal as controlled by the PFC module 108 in accordance with a desired power output. In one embodiment, the duty cycle or frequency of the switches S1 and S2 may be based upon control signals sent from the PFC module 108.

In one embodiment, a duty cycle may be defined as a time period for one on cycle and one off cycle. In one embodiment, the frequency may be defined as how many duty cycles occur within a predefined period of time (e.g., 5 duty cycles per second).

In one embodiment, the PWM2 106 illustrated by dashed lines may comprise switches S3, S4, S5, S6 and S7. In one embodiment, the switches S3 and S6 may be one or more load switches. In one embodiment, the switches S4 and S5 grouped by dashed lines 210 may be one or more commutation switches. In one embodiment, the switches S3, S4, S5 and S6 are driven by a driver 202.

In one embodiment, the load switches S3 and S6 and the commutation switches S4 and S5 may be operated and controlled by the MP 110. The MP 110 may control the duty cycle or frequency of the load switches S3 and S6 based upon a desired power output or an amount of power that is to be delivered to a load 208. In one embodiment, the MP 110 may send a control signal 218 (e.g., a PWM signal) containing the appropriate duty cycle or frequency to the driver 202. The MP 110 may operate and activate the commutation switches S4 and S5 to re-circulate voltage left in the load 208 to avoid harmful voltage spikes.

In one embodiment, the switch S7 may be controlled by the MP 110 to regulate the voltage level via the PFC module 108.

The MP 110 may send a control signal 214 (e.g., a PWM signal) containing the appropriate duty cycle or frequency to the switch S7. The switch S7 may receive feedback via a feedback signal 216. Operation of the switch S7 is discussed by example below.

The control signal 214 and 218 sent by the MP 110 may be based upon a current level and a voltage level of the circuit 100 measured by a current sense resistor 212. The current sense resistor 212 may be coupled to the metering module 114 (e.g., illustrated as M-SOC 114 in FIG. 2). The metering module 114 may continuously monitor the current level and the voltage level measured by the current sense resistor 212 and provide the information to the MP 110 to calculate the necessary duty cycles for operating the switches S3, S6 and S7.

In one embodiment, the filter 102 illustrated by dashed lines may comprise a switch S8 and a switch S9. If the filter 102 is a dynamic filter, the switches S8 and S9 may operate at a duty cycle that is proportional to the desired light output or intensity level. The level of switching noise that is filtered out may change as the desired power output changes. In another embodiment, if the filter 102 is a static filter, the level of filtering may be set at a worst case scenario level.

It should be noted that although a number of various switches are illustrated in FIG. 2, any number of switches may be deployed. For example, depending on the application, more or less switches may be deployed. In addition, depending on how each module is configured, for example the PWM1 104, the PWM2 106 and the filter 102, more or less switches may be deployed.

In addition, slight modifications may be made to the circuit 100 to achieve the same functions discussed herein that are still within the scope of the present disclosure. For example, the present disclosure encompasses the use of additional feedback circuits or feed forward circuits between various modules within the circuit depending on a particular application.

One working example of the load 208 (e.g., a light source, a street light fixture, an LED based street light fixture, and the like) operating at 100% intensity or light output and then reduced to 50% intensity or light output may be discussed to illustrate how the circuit 100 operates. In one embodiment, when the load 208 is operating at 100% intensity or light output, the MP 110 may send a control signal 218 to the driver 202 to keep the switches S3 and S6 in an on state 100% of the time. The MP 110 may also send a control signal 214 to the switch S7 to maintain the switch S7 on a mostly on state. In other words, the switch S7 may be operating on a extremely low duty cycle.

At some other time, a control signal may be sent to the MP 110 from a remote server that instructs circuit 100 to operate the load 208 at 50% intensity or light output. For example, the control signal may be received by the PLC module 116 or wirelessly over the RF communication module 112.

In response, the MP 110 may send a control signal 218 to the driver 202 to operate the switches S3 and S6 at a 50% duty cycle. However, such operation may cause a drop in voltage across the load. The current sense resistor 212 may measure the current level and the voltage level in the circuit 100. The metering module 114 may provide the measured current level and voltage level to the MP 110.

In one embodiment, based upon an operating profile or dimming curve profile of the load 208 (e.g., a current vs. voltage profile of a light source), the MP 110 may determine if the load 208 is operating in an optimal voltage or non-optimal voltage. If the load 208 is not operating at an optimal voltage, the MP 110 may determine how much the voltage level (e.g., an outgoing voltage level) must be adjusted (e.g., more or less) to operate the load 208 at an optimal voltage.

Based upon this determination, the MP 110 may send a control signal 214 to the switch S7 to operate a specified duty cycle to obtain a proper voltage adjustment. The PFC module 108 may detect the duty cycle of the switch S7 and respond by operating the switches S1 and S2 at a duty cycle in as a function of an operation of the switch S7. For example, the switches S1 and S2 may be operated proportional to the duty cycle the switch S7. The operation of the switches S1 and S2 adjust the voltage which is supplied by the switches S3 and S6.

In one embodiment, the current sense resistor 212 may measure the updated current level and updated voltage level. The metering module 114 may provide this information to the MP 110 and if the load 208 is not operating in an optimal state for 50% intensity or light output, the entire process may be repeated until the load 208 is operating at an optimal state.

One example algorithm may be as follows. $V_o$ may represent an output voltage, $V_i$ may represent an input voltage, $V_t$ may represent a target output voltage, $V_d$ may represent a change in voltage for 1% duty cycle change and $V_n$ may represent a difference between original input voltage and target voltage. In one embodiment, the target output voltage $V_t$ may be set to a desired value based upon the operating profile of the load 208.

The AC power supply may be turned on and the algorithm may operate as follows:
1. Record $V_i$
2. Drop duty cycle on S7 1% and record $V_o$
3. Calculate $V_d = V_o - V_i$
4. Calculate $V_n = V_t - V_i$
5. Calculate $V_n/V_d$=percentage duty cycle drop on S7=$V_n/V_d$ to obtain $V_t$ on output.

When a dimming control signal is received to adjust the intensity or light output of the load 208 the switches S3 and S6 may be manipulated to achieve the desired dimming level. Then the steps 1-5 above may be repeated.

Figure 3:
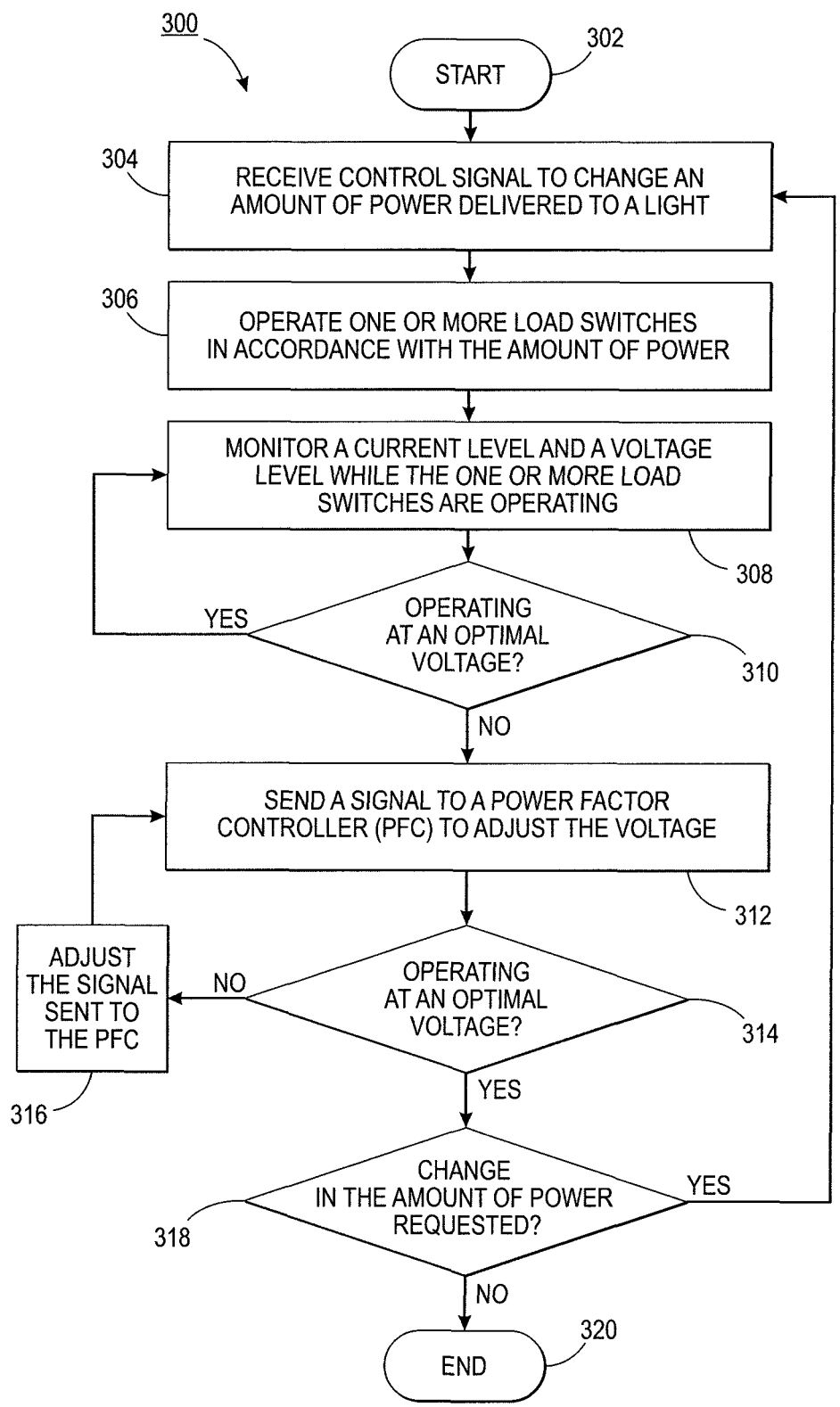
FIG. 3 depicts an example flow diagram of a method for adjusting a light output of a light operating on AC power.

FIG. 3 illustrates an example flowchart of one embodiment of a method 300 for automatically controlling an impedance of a circuit. In one embodiment, the steps, functions, or operations of the method 300 may be performed by the MP 110 in the AC to AC converter circuit 100 or a general purpose computer illustrated in FIG. 4 and discussed below.

The method 300 begins at step 302. At step 304, the method 300 receives a control signal to change an amount of power delivered to a light. For example, the control signal may be received, over either a wired connection or a wireless connection, from a remote or centralized control server over a WAN network via a PLC module or an RF communications module. In one embodiment, the control signal may be to change an intensity level or a light output level of the light, e.g., from 100% to 50%. As a result, the amount of power delivered to the light may be reduced by 50%.

At step 306, the method 300 operates one or more load switches in accordance with the amount of power. Using the example in step 304, the MP may send a control signal to the driver of one or more load switches (e.g., switches S3 and S6 in FIG. 2) to operate the one or more load switches in accordance with the desired power output. For example, the load switches may be operated at a 50% duty cycle to reduce the amount of power by 50%.

At step 308, the method 300 monitors a current level and a voltage level while the one or more load switches are operating. For example, a current sense resistor may be used to measure a current level and a voltage level in the circuit. The current level (e.g., an output current to the load) and voltage level (e.g., an output voltage to the load) may be used by the MP to determine if the target voltage is being met indicating that the light is operating at an optimal voltage.

At step 310, the method 300 determines if the light is operating at an optimal voltage. For example, if the measured voltage level is equal to or within a predefined threshold of the target voltage (e.g., +/−5%), the MP may determine that the light is operating at an optimal voltage. If the answer to step 310 is yes, the method 300 may then return to step 308 to continue monitoring the current level and the voltage level.

If the answer to step 310 is no, the method 300 may proceed to step 312. At step 312, the method 300 may send a signal to a PFC to adjust the voltage. For example, the percentage change in duty cycle may be calculated based upon the algorithm discussed above. The change in duty cycle may then be sent to a switch coupled to the PFC and the MP (e.g., the switch S7 in FIG. 2) to operate the switch in accordance with a desired power output. In other words, the duty cycle may be adjusted to obtain the needed target voltage.

In response, the PFC may then modify the operation of one or more boost switches (e.g., switches S1 and S2 in FIG. 2) to adjust the voltage as a function of an operation of the switch coupled to the PFC and the MP. For example, the boost switches may either provide more or less voltage depending on the amount of power to be delivered to the light and the change in duty cycle of the switch coupled to the PFC and the MP.

At step 314, the method 300 may determine if the light is operating at an optimal voltage. Similar to step 310 for example, if the measured voltage level is equal to or within a predefined threshold of the target voltage (e.g., +/−5%), the MP may determine that the light is operating at an optimal voltage. At step 314 if the answer to step 314 is no, the method 300 may proceed to step 316.

At step 316, the method 300 adjusts the control signal sent to the PFC. For example, the MP may calculate the additional change in duty cycle needed to operate the switch coupled to the PFC and the MP to obtain the needed target voltage. The method 300 then proceeds to step 312 again.

However, if the answer to step 314 is yes, the method 300 proceeds to step 318. At step 318, the method 300 determines if there is a change in the amount of power requested. For example, the central controller or server may send a control signal to the MP to increase the intensity of the light back to 100% from 50%.

If the answer to step 318 is yes, the method 300 may proceed to step 304. However, if the answer to step 318 is no, the method 300 may proceed to step 320. The method 300 ends at step 320.

It should be noted that although not explicitly specified, one or more steps or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 3 that recite a determining operation, or involve a decision, do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure.

Figure 4:
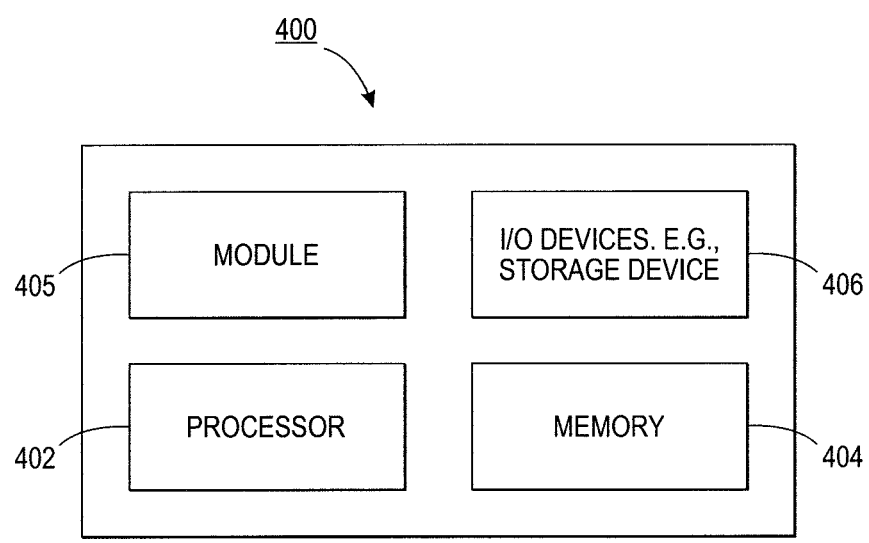
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for adjusting a light output of a light operating on alternating current (AC) power, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, the present module or process 405 for adjusting a light output of a light operating on alternating current (AC) power can be implemented as computer-executable instructions (e.g., a software program comprising computer-executable instructions) and loaded into memory 404 and executed by hardware processor 402 to implement the functions as discussed above. As such, the present method 405 for adjusting a light output of a light operating on alternating current (AC) power as discussed above in method 300 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An alternating current (AC) to AC converter circuit for independently adjusting a current level and a voltage level to adjust a light output of a light operating on AC power, comprising:

a microprocessor for controlling the current level and the voltage level delivered from an AC power source to the light operating on the AC power without AC to direct current (DC) conversion, wherein the current is an alternating current;

a first switch coupled to the microprocessor;

a power factor controller (PFC) module coupled to the first switch, wherein the first switch is controlled by the microprocessor in accordance with a desired power output via a pulse width modulation (PWM) control signal, wherein the PWM control signal determines a first duty cycle of the first switch coupled to the PFC module, wherein the first duty cycle is determined based upon an increase of the voltage level that is needed to operate the light at an optimal voltage level;

one or more boost switches coupled to the PFC module, wherein the one or more boost switches are controlled by the PFC module as a function of an operation of the first switch, wherein the PFC module adjusts the voltage level in accordance with the operation of the first switch by operating the one or more boost switches at a second duty cycle, wherein the second duty cycle is determined based upon the increase of the voltage level that is needed to operate the light at the optimal voltage level; and one or more load switches coupled to the one or more boost switches, wherein the one or more load switches are controlled by the microprocessor in accordance with the desired power output.

2. The AC to AC converter circuit of claim 1, further comprising:
a metering module coupled to the microprocessor, wherein the metering module monitors the current level and the voltage level and provides the current level and the voltage level to the microprocessor.

3. The AC to AC converter circuit of claim 2, further comprising:
a resistor coupled to the metering module to measure the current level.

4. The AC to AC converter circuit of claim 1, further comprising:
a filter coupled to the PFC module and the one or more load switches.

5. The AC to AC converter circuit of claim 4, wherein the filter is a dynamic filter.

6. The AC to AC converter circuit of claim 4, wherein the filter is a static filter.

7. The AC to AC converter circuit of claim 1, further comprising:
one or more communication modules coupled to the microprocessor.

8. The AC to AC converter circuit of claim 7, wherein the one or more communication modules comprise at least one of: a power line communication module (PLC) or a radio frequency (RF) communication module.

9. The AC to AC converter circuit of claim 1, wherein the one or more boost switches comprise a first boost switch and a second boost switch, wherein the first boost switch operates during a first portion of an AC wave signal and the second boost switch operates during a second portion of the AC wave signal as controlled by the PFC module in accordance with the desired power output.

10. The AC to AC converter circuit of claim 1, further comprising:
one or more commutation switches coupled to the one or more load switches.

11. A method for adjusting a light output of a light operating on alternating current (AC) power, comprising:
receiving a control signal to change an amount of power delivered to the light, wherein the power is delivered from an AC power source to the light as an AC power without AC to direct current (DC) conversion;
operating one or more load switches in accordance with the amount of power;
monitoring a current level and a voltage level while the one or more load switches are operating; and
sending a signal to a switch coupled to a power factor controller (PFC) module when the light is operating at a non-optimal voltage level, wherein the PFC module adjusts the voltage level in accordance with an operation of the switch, wherein the control signal comprises a pulse width modulation (PWM) signal, wherein the PWM signal determines a first duty cycle of the switch coupled to the PFC module, wherein the first duty cycle is determined based upon an increase of the voltage level that is needed to operate the light at an optimal voltage level, wherein the PFC module adjusts the voltage level in accordance with the operation of the switch by operating a first boost switch and a second boost switch at a second duty cycle, wherein the second duty cycle is determined based upon the increase of the voltage level that is needed to operate the light at the optimal voltage level.

12. The method of claim 11, further comprising:
monitoring the current level and the voltage level after the voltage level is adjusted by the PFC module to determine if the signal sent to the PFC module needs to be adjusted.

13. A tangible computer readable medium to store a plurality of instructions which, when executed by a processor, cause the processor to perform operations for adjusting a light output of a light operating on alternating current (AC) power, the operations comprising:
receiving a control signal to change an amount of power delivered to the light, wherein the power is delivered from an AC power source to the light as an AC power without AC to direct current (DC) conversion;
operating one or more load switches in accordance with the amount of power;
monitoring a current level and a voltage level while the one or more load switches are operating; and
sending a signal to a switch coupled to a power factor controller (PFC) module when the light is operating at a non-optimal voltage level, wherein the PFC module adjusts the voltage level in accordance with an operation of the switch, wherein the control signal comprises a pulse width modulation (PWM) signal, wherein the PWM signal determines a first duty cycle of the switch coupled to the PFC module, wherein the first duty cycle is determined based upon an increase of the voltage level that is needed to operate the light at an optimal voltage level, wherein the PFC module adjusts the voltage level in accordance with the operation of the switch by operating a first boost switch and a second boost switch at a second duty cycle, wherein the second duty cycle is determined based upon the increase of the voltage level that is needed to operate the light at the optimal voltage level.

14. The tangible computer readable medium of claim 13, further comprising:
monitoring the current level and the voltage level after the voltage level is adjusted by the PFC module to determine if the signal sent to the PFC module needs to be adjusted.

\* \* \* \* \*